Oct. 26, 1965   W. H. MARKWOOD, JR   3,214,503
UNIAXIAL ORIENTATION OF POLYPROPYLENE FILM
Filed Sept. 28, 1962
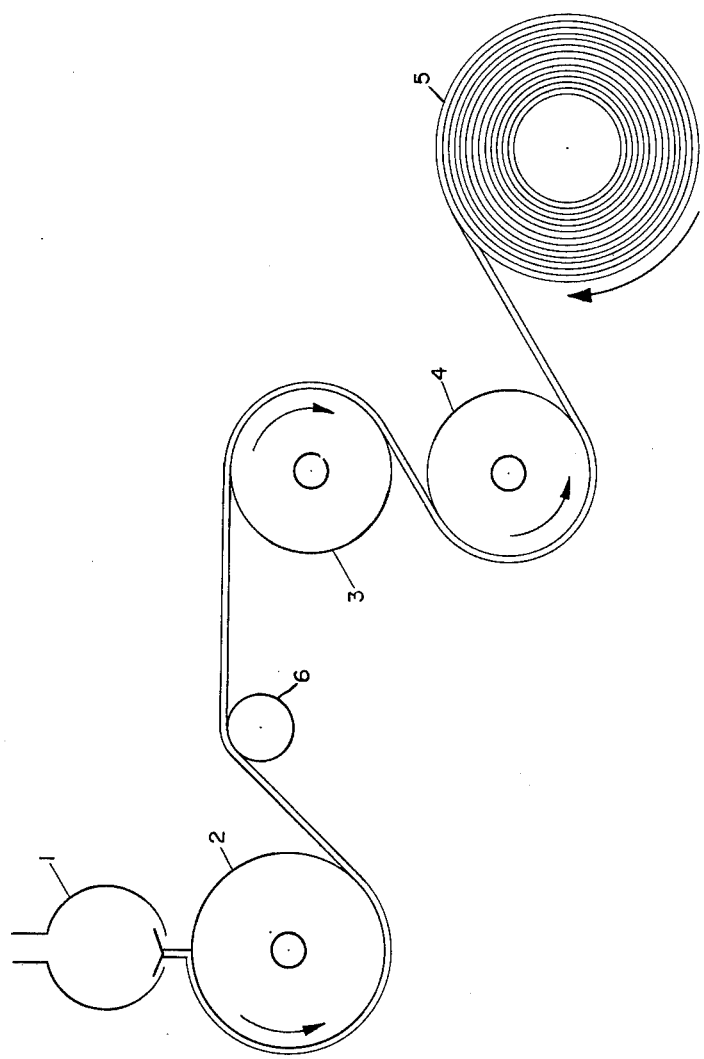
WILLIAM H. MARKWOOD JR.
INVENTOR.
BY Ernest G. Peterson
AGENT

United States Patent Office 3,214,503
Patented Oct. 26, 1965

3,214,503
UNIAXIAL ORIENTATION OF POLYPROPYLENE FILM
William H. Markwood, Jr., Wilmington, Del., assignor to Hercules Powder Company, Wilmington, Del., a corporation of Delaware
Filed Sept. 28, 1962, Ser. No. 226,822
3 Claims. (Cl. 264—210)

This application is a continuation-in-part of my co-pending applications Serial No. 37,396 filed June 20, 1960, now abandoned, and Serial No. 56,152 filed September 15, 1960, now abandoned.

The present invention relates to a process for making uniaxially oriented film of stereoregular polypropylene of improved cross-directional toughness.

Many crystallizable, organic, thermoplastic polymers such as poly(ethylene terephthalate), poly(hexamethyleneadipamide), poly(vinylidene chloride), and the like find one of their greatest uses as raw materials for the manufacture of transparent films. Such films may be either unoriented or oriented, and, if oriented, the orientation can be in a single direction or a plurality of directions.

The present invention is particularly concerned with a process for making a transparent, uniaxially oriented film of stereoregular, or isotactic, polypropylene, one of the newer crystallizable polymers. The uniaxially oriented films of the invention are particularly useful for the manufacture of tapes and similar articles that require high strength in only one direction.

The usual process for making a uniaxially oriented film from a crystallizable organic polymer is to extrude the molten polymer as a thin film, quench the molten film to retain the polymer in the amorphous state, and then stretch or draw the film in a single direction to induce orientation in the direction in which it is stretched. It is not difficult to make uniaxially oriented films of polymers such as poly(ethylene terephthalate) which have a second order transition temperature well above room temperature because such polymers are readily quenched to an amorphous state and while still amorphous can be stretched to induce orientation.

The manufacture of oriented film from stereoregular polypropylene presents quite a different problem because it is practically impossible to obtain this polymer in the amorphous state following the usual extrusion and quenching operations. Hence, by all practical methods the polymer must be drawn while it is crystalline. It is therefore not a simple matter to orient films of stereoregular polypropylene, and with the advent of this polymer it has been necessary for the art to devise entirely new methods for the manufacture of oriented film.

Many attempts have been made to produce uniaxially oriented polypropylene film by extruding, quenching, and stretching; but up to the present time all such films are fibrillar, i.e., they have the characteristics of a sheet of parallel fibers, which means that they are relatively weak in the direction at right angles to the axis of orientation, as evidenced by their low impact strength.

According to the present invention, there is provided a process for making stereoregular polypropylene film which is oriented uniaxially in the longitudinal or machine direction and which has substantially greater strength in the cross direction than heretofore obtainable in such type of film.

The invention is based upon the discovery that if an extruded and quenched film of stereoregular polypropylene is stretched or drawn 2 to 6 times its original length at an enormously high rate of draw in one direction it will retain surprisingly high strength in the direction transverse to drawing. By "rate of draw" it is intended to indicate, not the rate of take-up of the drawn film, but rather the rate, expressed in percent/minute, at which the film is elongated in the area where the drawing is actually accomplished. For example, in a conventional film drawing process, the film is drawn tangentially between differential speed rolls. "Rate of draw" thus indicates the rate at which the film is accelerated in increasing its linear speed from that of the slow roll to that of the fast roll. It has been determined that the rate of draw for the purposes of the invention must be at least about 75,000% per minute and can be up to as high as can be tolerated without breaking of the film. This high rate of draw means that the film must be drawn over an unusually short span, i.e., in the order of a few inches down to a fraction of an inch. The most practical method for drawing a film over such a short span is to draw the film tangentially between differential rolls that are positioned close to each other. The necessity for a short draw span can be understood by reference to the equation:

$$\text{Draw rate (percent/min.)} = 100 \frac{S_d + S_f}{2G}(R-1)$$

where:

$S_d$ = draw roll speed in ft./min.
$S_f$ = feed roll speed in ft./min.
$G$ = draw span in feet (tangential distance of film travel between feed roll and draw roll)

$$R = \frac{S_d}{S_f} = \text{draw ratio}$$

Commercial film manufacturing processes operate, for the sake of economy, at speeds ranging from about 90 to 1200 feet per minute. As an illustration of the narrowness of the draw span at such speeds, if the film is drawn 5× at the rate of 300,000% per minute at a take-up speed of 100 feet per minute, the drawn span must be only 1 inch. Thus, if both rolls are 6 inches in diameter, the gap between the rolls must be only 0.082 inch. As a further illustration, a draw of 2× at a draw rate of 75,000% per minute and a take-up speed of 400 feet per minute requires a draw span of 6 inches, or a roll-to-roll gap between 12-inch rolls of 1.4 inches.

The process of the invention is illustrated further in the attached drawing which shows diagrammatically one possible arrangement of apparatus for carrying out the process. Referring to the drawing, molten stereoregular polypropylene is extruded through the slot die of extruder 1 into contact with the surface of a cylindrical internally cooled casting drum 2 rotating at a peripheral speed sufficient to maintain an even cast film thickness. The film then passes over idler roll 6 onto cylindrical feed roll 3, which desirably has internal heating means and which rotates at a peripheral speed essentially the same, or very slightly faster, than drum 2. The film, after being heated by contact with roll 3, is conveyed therefrom onto the adjacent draw roll 4, which desirably has means for internal cooling and which rotates in opposite direction to roll 3 at a peripheral speed from 2 to 6 times that of feed roll 3 thereby drawing the film 2× to 6× in its span between feed rolls 3 and 4. Roll 4 is, of course, located sufficiently close to roll 3 that the draw span, or tangential distance of film distance between the rolls, is short enough to achieve the required draw rate. The film is thereafter stripped from roll 4 and conveyed to a wind-up roll 5 where it is wound into its final package.

Apart from the high rate of draw, the invention is practiced in accordance with known procedures. That is, the film is extruded, quenched, and then drawn at the specified draw rate and to the specified draw ratio.

The extrusion is carried out simply by expressing the molten polymer through a slotted die, the temperature of the molten polymer being conveniently from about 200 to 350° C. The quenching of the extrudate can be effected in various ways, as, for instance, by casting the extrudate onto a revolving casting drum or by immersing the extrudate in a bath of inert liquid such as water. One of the advantages of the invention is that the temperature to which the film is quenched is not critical; it may be as low a temperature as practical up to about 100° C.

It is desirable that the film be at a temperature of about 90 to 140° C. as it enters the drawing zone. Therefore, in those cases where the film has been quenched to below 90° C., it is reheated preparatory to drawing. The most convenient method of reheating is to pass the film over a heated feed roll as shown in the drawing and previously described.

The reheated film is next drawn at the draw rate and draw ratio previously specified for the invention. The draw roll that is used for this purpose can be at any convenient temperature sufficiently below the melting point of the polymer to avoid loss of film strength. Preferably, it will have a surface temperature below about 120° C. However, when it is desired to produce a uniaxially oriented film that is subsequently tenterable in the transverse direction, the draw roll should be cooled to a surface temperature no higher than about 40° C.

The draw rate, as mentioned before, is the definitive feature of the invention and must be at least 75,000% per minute. There is no precise upper limit on the draw rate, i.e., the film can be drawn at any rate above 75,000% per minute at which the film will not break. In most cases, breakage will occur when the draw rate approximates 550,000% per minute.

The draw ratio can be varied between about 2× and 6× the original length of the film. A draw of at least about 2× is needed to achieve appreciable orientation while a draw of about 6× gives about the maximum degree of orientation that is achievable. In subsequent data, the toughness of the film in the transverse direction is measured by a modified Charpy impact strength by a modification of ASTM D256–56. The test employed a standard Charpy tester having a 10 in. lb. capacity but with specimen holder modified to clamp the specimen in place and the pendulum drop height reduced to 6 inches so that the total capacity is 2.5 in. lb. As can be seen, the films of the invention are suprisingly tough in the direction perpendicular to the orientation. Thus, they lack the fibrillarity and tendency to split that is normally characteristic of uniaxially oriented films. In some cases, the uniaxially oriented films of the invention can be easily drawn in the transverse direction, if this is desired, in order to produce a biaxially oriented film without encountering difficulties in the way of splitting, wrinkling, or loss of orientation.

In order to further illustrate the invention, the following examples are presented.

*Example 1*

The apparatus employed in this and subsequent examples was arranged as illustrated in the drawing. The extruder was provided with a slot die 10 inches by .030 inch, the casting drum had a diameter of 12 inches and a length of 18 inches and was provided with means for internal cooling by circulation of water. Both the hot and cold rolls had diameters of 6 inches and lengths of 16 inches, the hot roll having means for internal heating by steam and the cold roll having means for internal heating by water.

In using the apparatus to practice the invention, molten stereoregular polypropylene having a melting point of 166° C. and a reduced specific viscosity (as determined on a 0.1% w./v. solution of polymer in decahydronaphthalene at 135° C.) of 2.5 was extruded at a temperature of 238° C. through the die at the rate of .25 lb. per minute onto the surface of the casting drum which was driven at a surface speed of 10.9 feet per minute. The film was then transferred to the feed roll which was heated to a surface temperature of 110° C. and was driven very slightly faster than the casting drum. The film, after remaining in contact with the feed roll for 180° of its periphery and being heated to a temperature of about 110° C., was conveyed diagonally to the draw roll over a draw span of .85 inch onto the cold roll which was rotated at a speed of 45.7 feet per minute and was internally cooled to a surface temperature of 18° C., resulting in a stretch of 4× at a draw rate of 120,000% per minute in the draw span. The film which remained in contact with the draw roll for 180° of its periphery was then passed to a wind-up roll rotating at the same speed as the draw roll.

The film resulting from this operation had the following properties:

| | |
|---|---:|
| Thickness, mils | 1.2 |
| Tensile strength, machine direction, p.s.i. | 25,000 |
| Elongation, machine direction, percent | 50 |
| Tensile strength, transverse direction, p.s.i. | 4,600 |
| Elongation, transverse direction, percent | 600 |
| Tensile modulus, machine direction, p.s.i. | 175,000 |
| Tensile modulus, transverse direction, p.s.i. | 140,000 |
| Impact strength | 30 ft.-lbs./in. |

In order to demonstrate the importance of the draw rate, the example is repeated exactly as described except for the alteration in each run of the draw rate by variation of the draw gap. The draw rates in each case and the impact strengths of the resulting films were as follows:

| Run | Draw Gap, in. | Draw Rate | Transverse Impact Strengths (Modified Charpy), ft.-lbs./in. |
|---|---|---|---|
| A | 2.5 | 41,000 | 20 |
| B | 3.6 | 28,500 | 15 |
| C | 0.85 | 79,000 | 30 |
| D | 0.85 | 245,000 | 30 |

As can be seen from the data, the impact strength of the films rises sharply with increase in draw rate until it reaches a maximum at a draw rate of about 75,000% per minute.

In additional examples illustrating the invention, the apparatus used was the same but conditions were varied as follows:

| Example No. | Extrusion Rate, lb./min. | Casting Drum Temp., °C. | Feed Roll Temp., °C. | Draw Roll Temp., °C. | Draw Rate, percent per minute | Draw Ratio | Draw Roll Speed, feet per minute |
|---|---|---|---|---|---|---|---|
| 2 | 0.25 | 10 | 93 | 21 | 95,000 | 4–1 | 36 |
| 3 | 0.28 | 10 | 110 | 21 | 600,000 | 4–1 | 62 |
| 4 | 0.2 | 21 | 110 | 21 | 300,000 | 4–1 | 150 |
| 5 | 0.28 | 10 | 110 | 110 | 107,000 | 4.1–1 | 39.0 |
| 6 | 0.3 | 10 | 110 | 21 | 175,000 | 3.6–1 | 60.8 |
| 7 | 0.3 | 10 | 110 | 21 | 120,000 | 3–1 | 50.3 |

In all of the preceding Examples 2 through 7, the film obtained had an impact strength of at least 30 ft. lbs./in.

What I claim and desire to protect by Letters Patent is:

1. The process of making uniaxially oriented film of stereoregular polypropylene which comprises extruding a flat film of molten stereoregular polypropylene, quenching the molten film to the solid state, and then drawing it between differential feed and draw rolls 2 to 6 times its original length at a draw rate of at least about 75,000% per minute, said draw rate, expressed in percent per minute, being calculated according to the equation:

$$\text{Draw rate} = 100 \frac{S_d + S_f}{2G}(R-1)$$

where $S_d$ represents the draw roll speed in feet per minute, $S_f$ represents the feed roll speed in feet per minute, G represents the draw span in feet and R represents the ratio of the draw roll speed to the pull roll speed.

2. The process of claim 1 wherein the draw roll has a peripheral speed of between 90 and 1200 feet per minute.

3. The process of claim 1 wherein the film is at a temperature of about 90 to 140° C. at the time it is drawn.

References Cited by the Examiner

UNITED STATES PATENTS

| | | | |
|---|---|---|---|
| 3,054,652 | 9/62 | Heumann | 264—210 |
| 3,104,937 | 9/63 | Wyckoff et al. | 264—288 |

FOREIGN PATENTS

| | | |
|---|---|---|
| 124,700 | 7/47 | Australia. |
| 627,801 | 9/61 | Canada. |
| 827,409 | 2/60 | Great Britain. |
| 873,220 | 7/61 | Great Britain. |
| 892,006 | 3/62 | Great Britain. |

OTHER REFERENCES

Finch: "Polypropylenes—Their Structure and Properties," Fibres and Plastics, January 1960, pages 14–16.

Jack: "Biaxial Stretching of Polypropylene," British Plastics, vol. 34, No. 6, June 1961.

Sherman et al.: The New Fibers, published in 1946 by D. Van Nostrand Co., Inc., New York, pages 7–9.

ALEXANDER H. BRODMERKEL, *Primary Examiner.*

ROBERT F. WHITE, *Examiner.*